US012779756B2

(12) United States Patent
Taiariol et al.

(10) Patent No.: US 12,779,756 B2
(45) Date of Patent: Nov. 3, 2026

(54) APPARATUS AND METHOD FOR APPLYING A COATING MATERIAL TO A WIRE

(71) Applicant: Tre Tau Engineering S.R.L., Pianezza (IT)

(72) Inventors: Francesco Taiariol, San Giusto Canavese (IT); Piero Degasperi, Trento (IT); Filippo Veglia, Turin (IT)

(73) Assignee: Tre Tau Engineering S.R.L., Pianezza (IT)

( * ) Notice: Subject to any disclaimer, the term of this patent is extended or adjusted under 35 U.S.C. 154(b) by 48 days.

(21) Appl. No.: 19/122,365

(22) PCT Filed: Oct. 16, 2023

(86) PCT No.: PCT/IB2023/060411
§ 371 (c)(1),
(2) Date: Apr. 18, 2025

(87) PCT Pub. No.: WO2024/084373
PCT Pub. Date: Apr. 25, 2024

(65) Prior Publication Data
US 2026/0151947 A1 Jun. 4, 2026

(30) Foreign Application Priority Data
Oct. 21, 2022 (IT) ........................ 102022000021828

(51) Int. Cl.
*B29C 48/154* (2019.01)
*B05C 3/12* (2006.01)
(Continued)

(52) U.S. Cl.
CPC .............. *B29C 48/154* (2019.02); *B05C 3/12* (2013.01); *B05C 3/172* (2013.01);
(Continued)

(58) Field of Classification Search
CPC ... B29C 48/154; B29C 48/802; B29C 48/834; B29C 48/82; B05C 3/12; B05C 3/172; B05C 3/005; B05C 11/1042
See application file for complete search history.

(56) References Cited

U.S. PATENT DOCUMENTS 2,702,410 A 2/1955 Brown
3,979,488 A 9/1976 Greenhalgh et al.
(Continued)

FOREIGN PATENT DOCUMENTS

DE 21 62 329 A1 7/1972
EP 3 192 081 B1 3/2019
(Continued)

OTHER PUBLICATIONS

International Preliminary Report on Patentability dated Mar. 1, 2025, issued in PCT Application No. PCT/IB2023/060411, filed Oct. 16, 2023.
(Continued)

*Primary Examiner* — Atul P. Khare
(74) *Attorney, Agent, or Firm* — Workman Nydegger

(57) ABSTRACT

An apparatus for applying a coating material to a wire includes: a coating chamber for applying a coating material to the wire passing through the coating chamber, an elongate injection channel including a first portion having an opening for receiving a predetermined quantity of coating material in a solid-state and a second portion being in communication with the coating chamber, at least one heating element configured to raise the temperature of the coating material as the coating material flows through the injection channel. The coating apparatus further includes: a pressurizer that exerts a predetermined pressure on the coating material in the first portion of the injection channel and allows the injection channel to receive the predetermined quantity of solid-state
(Continued)

coating material; a cooling system configured to cool at least part of the first portion of the injection channel.

8 Claims, 4 Drawing Sheets

(51) Int. Cl.

| | |
|---|---|
| ***B05C 3/172*** | (2006.01) |
| ***B05C 11/10*** | (2006.01) |
| ***B29C 48/34*** | (2019.01) |
| ***B29C 48/475*** | (2019.01) |
| ***B29C 48/80*** | (2019.01) |
| ***B29C 48/82*** | (2019.01) |
| ***B29C 48/92*** | (2019.01) |
| ***H01B 13/06*** | (2006.01) |
| *B05C 3/00* | (2006.01) |
| *B29L 31/34* | (2006.01) |

(52) U.S. Cl.

CPC .......... *B05C 11/1042* (2013.01); *B29C 48/34* (2019.02); *B29C 48/475* (2019.02); *B29C 48/802* (2019.02); *B29C 48/82* (2019.02); *B29C 48/834* (2019.02); *B29C 48/92* (2019.02); *H01B 13/06* (2013.01); *B05C 3/005* (2013.01); *B29C 2948/92209* (2019.02); *B29C 2948/924* (2019.02); *B29C 2948/92704* (2019.02); *B29C 2948/92895* (2019.02)

(56) References Cited

U.S. PATENT DOCUMENTS

| | | | | |
|---|---|---|---|---|
| 4,197,070 | A * | 4/1980 | Koschmann | B29C 48/92 425/161 |
| 4,252,755 | A | 2/1981 | Normanton et al. | |
| 4,649,262 | A * | 3/1987 | Yoshikawa | B29C 48/83 219/424 |
| 2010/0218968 | A1 | 9/2010 | Levy et al. | |
| 2020/0030839 | A1 * | 1/2020 | Veglia | B05C 11/021 |

FOREIGN PATENT DOCUMENTS

| | | | |
|---|---|---|---|
| EP | 3 518 255 | B1 | 4/2020 |
| JP | S54-29083 | A | 3/1979 |
| JP | S59-30419 | A | 2/1984 |
| JP | S61-143113 | A | 6/1986 |
| JP | H04-201536 | A | 7/1992 |
| RS | 60683 | B1 | 9/2020 |

OTHER PUBLICATIONS

Italian Search Report dated May 11, 2023, issued in Italian Application No. 202200021828, filed Oct. 21, 2022.

International Search Report dated Jan. 4, 2024, issued in PCT Application No. PCT/IB2023/060411, filed Oct. 16, 2023.

* cited by examiner

APPARATUS AND METHOD FOR APPLYING A COATING MATERIAL TO A WIRE

BACKGROUND OF THE DISCLOSURE

1. The Field of the Disclosure

The present invention relates to the field of apparatus for coating a wire with a layer of coating material. More in detail, the invention relates to a coating apparatus of the type capable of applying a layer of coating material on a wire without using any type of solvent (also referred to as solvent-free coating apparatus in the rest of the present description). An example of a solvent-free coating apparatus can be found in the document EP3192081 on behalf of the same assignee.

2. The Relevant Technology

A solvent-free coating apparatus according to the present invention comprises a coating chamber for applying a coating material to a running wire; an elongate injection channel for receiving, heating, and supplying the coating material to the coating chamber; and a pressurizer configured to press the coating material within the injection channel.

As fully described in the aforementioned document, one of the key aspects of a solvent-free coating apparatus relies in the ability of accurately maintaining the coating material in the coating chamber under a predetermined constant pressure and temperature. To this end, it is of paramount importance to precisely control both the quantity of coating material supplied to the coating chamber and the pressure applied on it.

According to known coating techniques (based, for example, on extrusion coating) the coating material is typically delivered to the coating apparatus and simultaneously pressurized by means of a single device (e.g., a pump or a screw feeder); although efficient, in terms of cost and space, such kind of devices do not allow to accurately control the quantity of coating material injected into the system and, at the same time, the pressure applied on it; as a result, the coating layer of a wire processed by known coating techniques is typically characterized by poor mechanical and thermal properties. For example, the geometry and the thickness of the coating layer laid on a wire by known coating techniques are usually not adjustable nor finely tunable. Another typical problem of known coating apparatuses is their limited operative range which prevents from employing particularly challenging coating materials. An example of such known coating device can be found in the U.S. Pat. No. 4,252,755.

SUMMARY OF THE DISCLOSURE

As opposed to known coating devices, the solvent-free coating apparatus according to the present invention comprises a dedicated feeding system configured to precisely calibrate the quantity of solid-state coating material (e.g., powder, pellets, grains, cartridges etc.) delivered into the injection channel of the coating apparatus. The solvent-free coating apparatus according to the present invention further comprises a dedicated pressurizer configured to press the solid-state coating material after entering the injection channel. By employing two dedicated devices (i.e., a feeder and a pressurizer), the solvent-free coating apparatus according to the present invention allows to precisely control both the quantity of the coating material delivered into the injection channel (also referred to as capacity in the rest of the present description) and, at the same time, the pressure applied on it. Further, the precise control of both capacity and pressure allows to indirectly control the residence time of the coating material within the coating apparatus (i.e., the time interval occurring from the introduction of the coating material into the injection channel to the time instant when the coating material exits the solvent-free coating apparatus). This is particularly relevant when employing challenging coating materials (e.g., thermosetting polymers) that start degrading and setting (e.g., reticulating) as soon as exposed to high temperatures.

As better explained in the rest of the present description, the pressurizer according to the present invention is configured to cause flowing of the coating material through the injection channel towards the coating chamber; at the same time, the injection channel is configured to progressively heat the coating material as it flows towards the coating chamber so as to reach a predetermined viscosity and temperature.

In order to prevent chemical and physical deterioration of the coating material, it is essential to avoid stagnation and overheating of the coating material along the injection channel. In particular, an inaccurate temperature management of the coating material within the injection channel may cause early melting and recirculation of the coating material around the working area of the pressurizer thus increasing the chances of degrading it. For example, early melted coating material getting in direct touch with the pressurizer could trigger partial or total clogging of the pressurizer and cause stagnation and subsequent deterioration of the coating material stranded on the surface of the pressurizer. As a consequence, an inaccurate temperature management could cause inefficiencies and even malfunctions of the pressurizer, therefore preventing the solvent-free coating apparatus to achieve optimal performances. In this regard, it is worth noting that the use of a sealed pressurizer would be highly undesirable as it would increase the complexity and the cost of the apparatus and, more importantly, it would require high maintenance. Further, as it will become apparent in the rest of the present description, a sealed pressurizer would cause a significant change of pressure in the coating chamber during the operations for loading the solid-state coating material into the apparatus.

To solve these and other problems, it is therefore essential to guarantee an accurate temperature management of the coating material in the injection channel so as to prevent, for example, uncontrolled and early melting of the coating material. Furthermore, for the reasons explained above, it is desirable to prevent any direct contact between melted coating material and the pressurizer; for example, it is advantageous to guarantee that the layer of coating material on which the pressurizer exerts pressure is maintained in a solid state (i.e., powder, pellets, grains, etc.).

The present invention stems from the desire to overcome the above-mentioned issues which can occur during operation of the solvent-free coating apparatus described in the aforementioned patent EP3192081, thus providing a coating apparatus improved under many respects.

The object of the present invention is to provide a coating apparatus of the type indicated at the beginning of the present description, which results easily maintainable and improved from the point of view of temperature management during operation.

A further object of the present invention is to provide a coating apparatus which allows to avoid stagnation and overheating of the coating material along the injection channel.

A further object of the present invention is to provide a coating apparatus, which allows simple cleaning and maintenance operations.

A further object of the present invention is to provide a coating apparatus which prevents malfunctions and inefficiencies of the pressurizer.

A further object of the present invention is to provide a coating apparatus which allows precise control of both capacity and pressure in the coating chamber.

A further object of the present invention is to provide a coating apparatus of the type indicated at the beginning of the present description, which enhances the ranges of operative parameters, such as pressure, temperature, wire speed and wire coating thickness, in order to achieve wires with a coating layer made of polymeric materials extremely difficult to process with known technologies.

In view of achieving these objects, the present invention relates to an apparatus for coating a wire having all the features indicated in the annexed claim 1. The present invention also relates to a method for applying a coating material to a wire.

BRIEF DESCRIPTION OF THE DRAWINGS

Further objects, features and advantages of the present invention will become apparent from the following detailed description with reference to the annexed characteristics, given purely by way of non-limiting examples, in which.

DETAILED DESCRIPTION OF THE PREFERRED EMBODIMENTS

In the following description, various specific details are illustrated aiming at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

In the annexed drawings, reference 100 generally designates a first preferred embodiment of an apparatus for applying a coating material to a wire 106 according to the present invention. The apparatus 100 may be used to apply a coating material to any type of wire 106, avoiding the use of solvents as primary agent for applying a coating to a wire 106 while guaranteeing optimal mechanical and thermal properties of the resulting coated wire 106. The wire 106 may comprise any type of metal, such as copper, aluminum, or steel. Copper and aluminum wires 106 are typically used for electrical applications such as a winding of an electromagnet. The coating material can be any type of coating material; for example, the coating material can comprise a plastic coating material such as a thermosetting or a thermoplastic polymer.

Figure 1A:
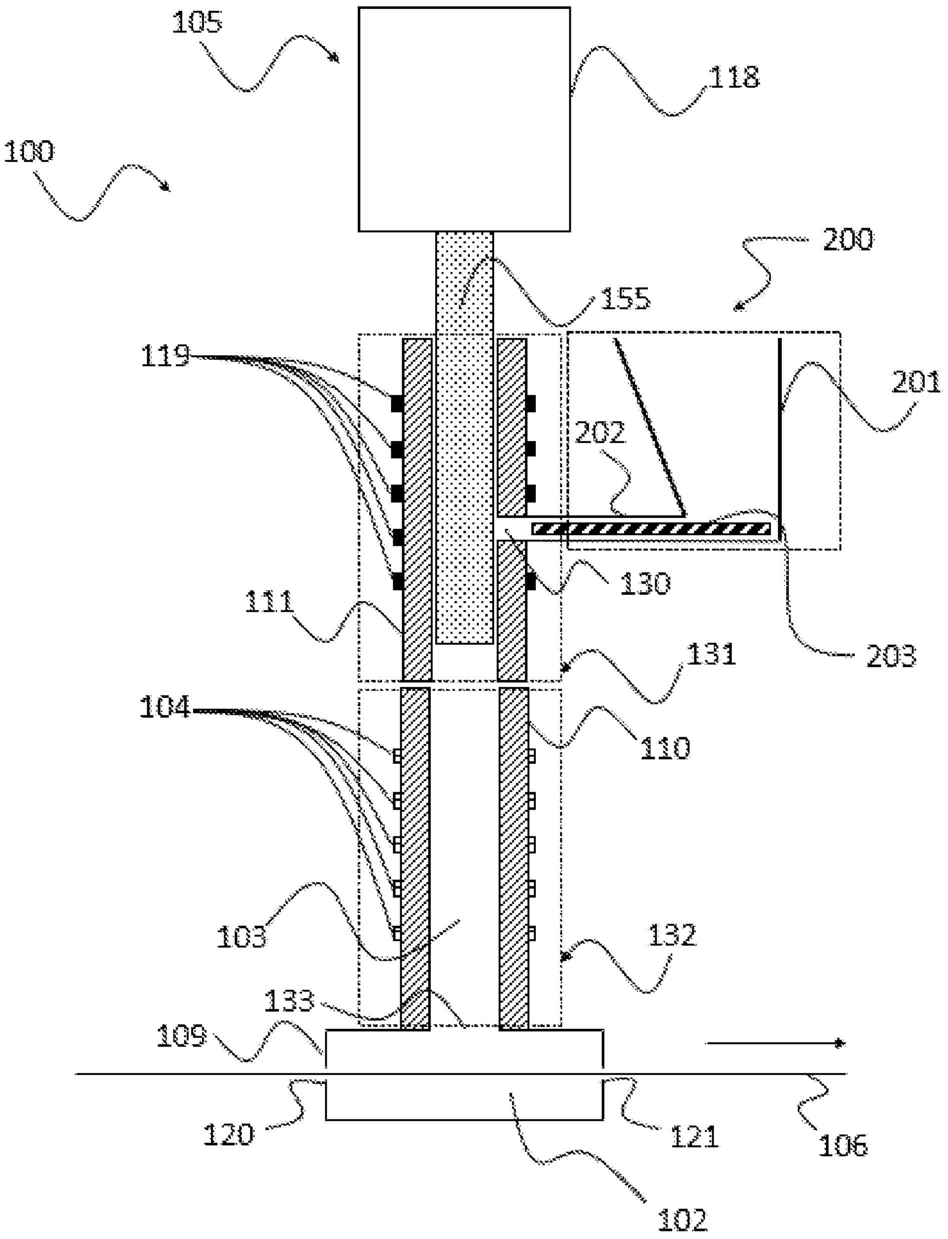
FIG. 1*a* shows a cross-sectioned front view of a first preferred embodiment of an apparatus for coating a wire according to the present invention and during a first operating phase.
Figure 1B:
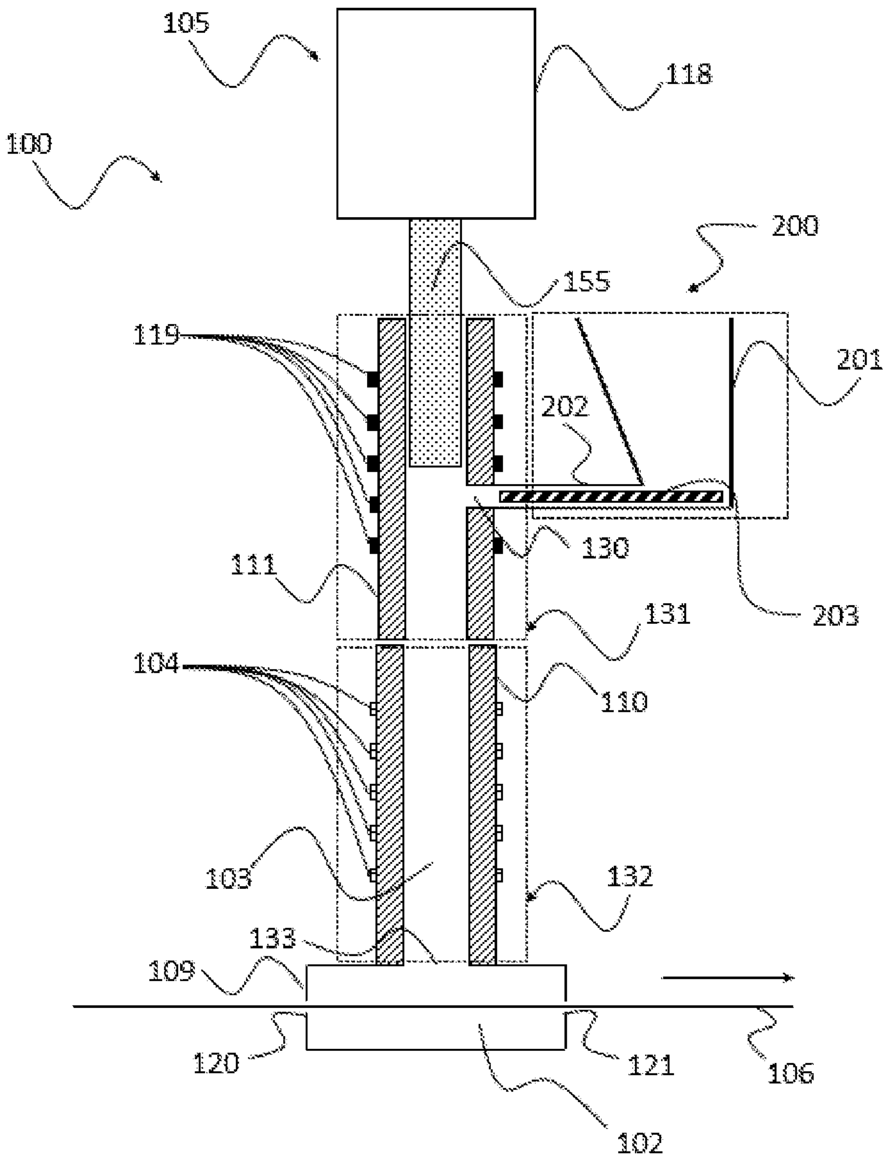
FIG. 1*b* shows a cross-sectioned front view of the first preferred embodiment of the apparatus according to the present invention and during a second operating phase.

With reference to FIGS. 1*a* and 1*b*, the coating apparatus 100 according to the present invention comprises a coating chamber 102 for applying a coating material to a wire 106 passing through the coating chamber 102; to this end, the coating chamber 102 comprises an inlet port 120 configured for receiving the wire 106 and an outlet port 121 configured for releasing the wire 106. More specifically, the coating chamber 102 has an inlet port 120 through which a wire 106 can pass and enter in the coating chamber 102 and an outlet port 121 through which the wire 106 can come out from the coating chamber 102 with an outer layer of coating material.

The applied coating can comprise any type of coating material such as, for example, thermosetting or thermoplastic polymer material. Thermosetting materials enable, in general, higher quality coating and perform better at high temperature than thermoplastic materials. The specific type of thermosetting or thermoplastic material that is used may depend on the type of metal of which the wire 106 is made of and/or the required properties of the coating according to the final application for which the wire 106 is produced. The thermosetting polymers may comprise any of polyester, epoxy-polyester mixture, polyethylene, polyurethane, polyethylenimine, polyamide, polyimide, polyamide-imide, a thermosetting polyvinyl formal compound, epoxy, polyesterimide, Polyvinyl fluoride (PVF), and other materials. The coating material may be a mixture of any of these polymers as well as with other substances, in particular thermosetting additives. For example, a mixture comprising 60% polyvinyl formal and 40% thermosetting additive, or polyesterimide and amideimide mixture, may be used as coating material.

Thermoplastic polymers can comprise, for example, Perfluoroalkoxy (PFA), Polyether ether ketone (PEEK), Polyether ketone ketone (PEKK), Polyetherimide (PEI), Polyphenylene sulfide (PPS), Fluorinated ethylene propylene (FEP), Ethylene tetrafluoroethylene (ETFE), Polytetrafluoroethylene (PTFE), Polyaryletherketone (PAEK), Polyamide-imides (PAI), Polyvinyl fluoride (PVF).

Figure 2:
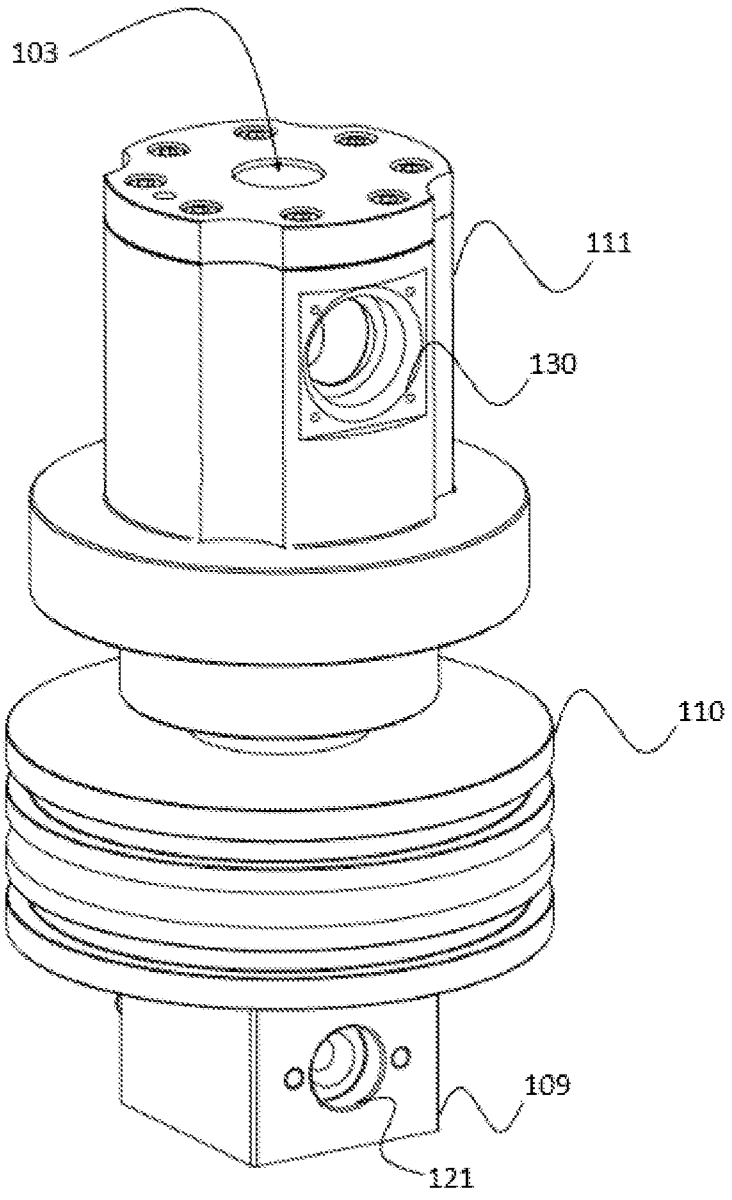
FIG. 2 shows an enlarged perspective view of a second embodiment of the apparatus according to the present invention.
Figure 3:
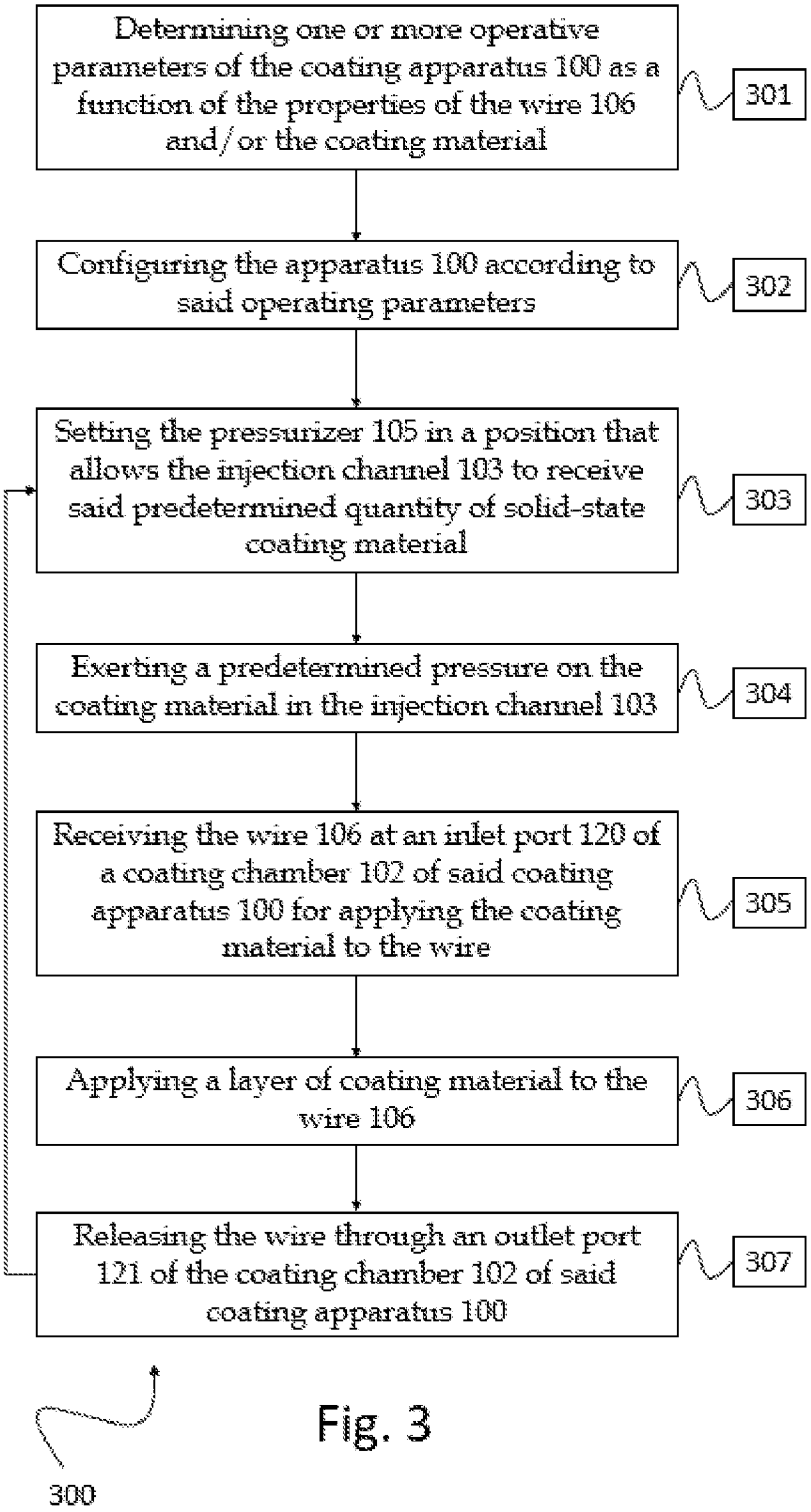
FIG. 3 shows a diagram of a method for applying a coating material to a wire according to the present invention.

With reference to FIGS. 1*a*, 1*b*, and 2, the apparatus 100 further comprises an elongate injection channel 103 for receiving a predetermined quantity of solid-state coating material at an opening 130 and for supplying the received coating material to the coating chamber 102 which is arranged in communication with an end 133 of the injection channel 103. More specifically, the injection channel 103 comprises a first portion 131 comprising the opening 130 for receiving solid-state coating material and a second portion 132 configured to be in communication with the coating chamber 102.

The coating chamber 102 is configured to be in fluid communication with the end 133 of the injection channel 103, for enabling the passage of the coating material from the injection channel 103 to the coating chamber 102 and for allowing smooth propagation of the pressure from the injection channel 103 to the coating chamber 102.

Prior to being fed into the injection channel 103, the coating material is in solid-state such as, for example, powder, solid pellets, chips or cartridges or in other solid forms that are generally known for paints and enamels.

As shown in FIGS. 1*a* and 1*b*, according to an aspect of the present invention, the coating material can be inserted into the injection channel 103 by means of an automated feeding system 200 configured for driving the coating material within the injection channel 103 through the opening 130. Preferably, the opening 130 is provided at a side portion of the injection channel 103.

According to known technologies, the automated feeding system 200 includes a hopper 201 provided for inserting solid-state coating material, for example in the form of powder, and a duct 202 connecting the hopper 201 with the opening 130. A screw feeding element 203 can be provided within said duct 202, for rotating within the duct 202 and driving the coating material through the duct 202, up to reach the opening 130, thus entering into the injection channel 103.

As shown in FIGS. 1*a*, 1*b*, and 2, the coating apparatus 1 may comprise a support casing comprising a plurality of casings 109, 110, 111 rigidly connected to each other. Said support casing (i.e., each of said casings 109, 110, 111) can be preferably made of heat conductive material, such as metal, in order to ensure that uniform heating of the coating material (in particular due to the heating elements 104 hereinafter described) is maintained within each thermal zone of the apparatus 100.

The first portion 131 of the injection channel 103 can be located, for example, within an upper casing 111, and the second portion 132 can be located, for example, within an intermediate casing 110. Furthermore, the injection channel 103 may comprise a cylinder (in particular, a metal cylinder) comprising both the first portion 131 and the second portion 132 of the injection channel 103 that can be inserted, for example, within one or more of said casings 110, 111 of the apparatus 100.

According to an embodiment of the present invention, said injection channel 103 may have a cylindrical shape with a constant diameter along its entire length, thus avoiding bottleneck-like shape portions which could obstacle flowing of the coating material. This shape of the injection channel 103 enables achievement of an efficient fluid transmission of the coating material towards the coating chamber 102, simple cleaning and maintenance operations of the injection channel 103.

Furthermore, due to the geometry of the injection channel 103 which does not provide any narrowing, a wide opening for the coating material towards the coating chamber 102 can be provided, so maximizing flow of coating material within the coating chamber 102 while facilitating cleaning and maintenance operations.

As described in detail in the rest of the present description, in order to achieve a desired viscosity of the coating material in the coating chamber 102, the coating apparatus 100 according to the present invention is configured to progressively heat the coating material as it flows through the injection channel 103. More specifically, the coating apparatus 100 is configured to move the solid-state coating material inserted in the first portion 131 of the injection channel 103 to the second portion 132 of the injection channel 103 where the solid-state coating material is progressively melted until reaching a desired viscosity and density.

To this end, the coating apparatus 100 according to the present invention further comprises a pressurizer 105 configured to press the coating material within the injection channel 103 in order to cause flowing of the coating material through the injection channel 103.

The apparatus 100 according to the present invention comprises also at least one heating element 104 which is controllable to progressively raise the temperature of the coating material, as the coating material flows through the injection channel 103, in order to achieve a desired viscosity of the coating material within the coating chamber 102. By accurately controlling the temperatures throughout the injection channel 103 of the coating apparatus 100, molten coating material is directly applied to a wire 106 which passes through the coating chamber 102.

As described in more detail in the rest of the present description, once a required pressure is reached, the pressurizer 105 does not pressurize the coating material any further but it can be configured to maintain a constant predetermined pressure within the injection channel 103 and the coating chamber 102.

As shown in FIGS. 1*a* and 1*b*, according to an embodiment of the present invention, the pressurizer 105 can comprise a stem 155 which is axially driven along the length of the injection channel 103 by an actuator 118 (for example, an electrically operated actuator).

The pressurizer 105 may further comprise a cylinder rigidly connected to the stem 155 and driven by the actuator 118, whereas the actuator 118 is configured to effectively tune the pressure inside the coating chamber 102 by adjusting dynamically the movement of the cylinder and the stem 155 as the coating material progresses through the injection channel 103.

Furthermore, the stem 155 driven by, for example, the actuator 118 guarantees a quick reaction time for controlling the pressure according to the required high operation speed of the apparatus 100. The details of the actuator 118 are not illustrated in the annexed drawings because they can be provided according to any known configuration and because the removal of such details from the drawings would render the latter more understandable.

In order to avoid direct contact between the pressurizer 105 and the liquid-state coating material contained in the second portion 132 of the injection channel 103, the pressurizer 105 is configured to follow a cyclic working regime whereas each cycle (of said cyclic working regime) comprises a first operating phase (also referred to as "pressing phase" in the rest of the present description; see FIG. 1A) for pressing the coating material contained in the first portion 131 of the injection channel 103, and a second operating phase (also referred to as "loading phase" in the rest of the present description; see FIG. 1B) for allowing said injection channel 103 to receive a predetermined quantity of solid-state coating material.

More specifically, the pressurizer 105 according to the present invention is configured to operate according to a first operating phase during which the pressurizer 105 exerts a predetermined pressure on the coating material contained in said first portion 131 of said injection channel 103, and a second operating phase during which the pressurizer 105 releases the pressure off the coating material so as to allow said injection channel 103 to receive a predetermined quantity of solid-state coating material. More specifically, during said second operating phase, the pressurizer 105 is in a position that allows said injection channel 103 to receive a predetermined quantity of solid-state coating material.

During the pressing phase, a predetermined pressure is exerted by the pressurizer 105 exclusively on the solid-state coating material contained in said first portion 131 of the injection channel 103.

For the sake of clarity, it is worth noting that, at least during the pressing phase, the quantity of coating material contained in the injection channel 103 progressively diminishes as the wire 106 passing through the coating chamber 102 gradually carries away part of it. As a result, in order to maintain a constant pressure on the coating material in the coating chamber 102, the pressurizer 105 must adapt its position inside the injection channel 103. More specifically, according to an embodiment of the present invention, the stem 155 of the pressurizer 105 can progressively move down the injection channel 103 as the amount of coating material in the injection channel 103 decreases. According to a further aspect of the present invention, in order to avoid any contact between liquid-state coating material and the pressurizer 105, the pressing phase can be terminated before the stem 155 reaches the portion of the injection channel 103 where the coating material is in a liquid state. For example, the pressing phase can be terminated before the pressurizer 105 (e.g., the stem 155) reaches the second portion 132 of the injection channel 103. To this end, said pressurizer 105 comprises a stroke length, the stroke length of the pressurizer 105 being limited to said first portion 131 of the injection channel 103; i.e., said stroke length can be configured to limit the travel of the pressurizer 105 to the first portion 131 of the injection channel 103, in particular during the pressing phase. This way, the likelihood of getting the pressurizer 105 in direct contact with the liquid-state coating material contained in the second portion 132 of the injection channel 103 can be minimized.

As shown in FIG. 1*a*, according to a further aspect of the present invention, during the pressing phase, the pressurizer 105 (e.g., the stem 155) can be preferably configured to engage with the opening 130 of the injection channel 103 in order to avoid any pressure leak. As a result, the pressure exerted on the solid-state coating material contained in the first portion 131 of the injection channel 103 can be completely transferred to the second portion 132 of the injection channel 103 and, consequently, to the coating material contained in the coating chamber 102. According to a specific embodiment of the present invention, the stem 155 can be configured to engage with and to cover the opening 130 before getting in contact with the solid-state coating material contained in the first portion 131 of the injection channel 103. For example, as shown in FIG. 1*a*, during the pressing phase, the stem 155 can be configured to fully lock the opening 130 of the injection channel 103 so as to prevent the coating material to leak back to the duct 202 during the pressing phase. As a result, the pressure exerted on the solid-state coating material in the first portion 131 of the injection channel 103 can be fully transferred to the coating material contained in the second portion 132 of the injection channel 103 and, consequently, to the coating material inside the coating chamber 102. It is worth noting that, thanks to the aforementioned feature, the complexity and the maintenance of the coating apparatus 100 is improved.

In addition, as shown in FIG. 1*b*, at the beginning of the loading phase the pressurizer 105 can be configured to release the pressure off the solid-state coating material and to move to a position that allows said injection channel 103 to receive a predetermined quantity of solid-state coating material. According to an embodiment of the present invention, after terminating the pressing phase (or at the beginning of the loading phase), the stem 155 can release the pressure off the coating material by moving upwards along the injection channel 103. In particular, as shown in FIG. 1*b*, in order to allow the injection channel 103 to receive the solid-state coating material, the stem 155 can be configured to fully disengage with the opening 130 (e.g., to unlock the opening 130) so as to connect the duct 202 with the injection channel 103.

Furthermore, the quantity of solid-state coating material to be loaded into the injection channel 103 during the loading phase can be determined so as to achieve a plurality of advantageous effects. For example, the quantity of solid-state coating material to be loaded into the injection channel 103 can be determined as a function of the rate at which the coating material exits the coating apparatus 100 (i.e., the quantity of coating material carried away from the coating chamber 102 by the running wire 106 per time unit). Further, according to a preferred embodiment of the present invention, the quantity of solid-state coating material to be loaded into the injection channel 103 at each loading phase can be determined so as to allow the pressurizer 105 to fully engage with the opening 130 of the injection channel 103 during the pressing phase. More specifically, at the beginning of each pressing phase, the stem 155 moves downwards along the injection channel 103 until reaching the surface of the solid-state coating material inserted in the injection channel 103 during the loading phase. In order to allow a proper lock of the opening 130 during the pressing phase, the upper surface of the solid-state coating material loaded in the injection channel 103 must be in between the opening 130 and the end 133 of the injection channel 103. As a result, when moving downwards, the pressurizer 105 necessarily engages with the opening 130 before reaching the surface of the solid-state coating material.

The quantity of coating material exiting the apparatus 100 can be calculated or estimated according to known techniques. For example, the quantity of coating material exiting the apparatus 100 at each working cycle can be determined experimentally before entering into production.

Alternatively, or in addition, the injection channel 103 can comprise measuring means for measuring the quantity of coating material remaining in the injection channel 103 at the end of each pressing phase. For example, the injection channel 103 can comprise at least one sensor located in the first portion 131 of the injection channel 103 for measuring the quantity of the solid-state coating material contained in said first portion 131 of the injection channel 103. Said at least one sensor can be operatively connected to the feeding system 200 for enabling the feeding system 200 to precisely control the quantity of coating material to be inserted into the injection channel 103 on the basis of the readings of said at least one sensor. In general, the quantity of coating material to be inserted into the injection channel 103 at each loading phase can be determined on the basis of the quantity of coating material contained in the injection channel 103 at the beginning of the loading phase.

Furthermore, while guaranteeing full lock of the opening 130 during the pressing phase, the quantity of coating material inserted into the injection channel 103 can be determined so as to maximize the duration of the pressing phase; as a result, the time ratio between the pressing phase and the duration of a whole working cycle (i.e., also referred to as duty cycle of the apparatus 100) can be maximized with the result of minimizing pressure variations inside the coating chamber 102.

As previously indicated, the coating apparatus 100 according to the present invention has a support casing comprising, for example, a plurality of casings 109, 110, 111 rigidly connected to each other. The support casing can be preferably made of heat conductive material, such as metal, in order to ensure that uniform heating of the coating material, due to the heating elements 104, is maintained within each thermal zone of the apparatus 100.

In the preferred embodiments shown in the drawings, the support casing of the coating apparatus 100 comprises a lower casing 109 comprising the coating chamber 102 and the end 133 of the injection channel 103.

Yet with reference to the preferred embodiments, the support casing comprises an intermediate casing 110 including a plurality of said heating elements 104 and said second portion 132 of the injection channel 103.

Yet with reference to the preferred embodiments, the support casing further comprises an upper casing 111 comprising the first portion 131 of the injection channel 103 and the opening 130 for receiving the coating material.

As previously indicated, said at least one heating element 104 has to be configured to heat different parts of the apparatus in order to progressively raise the temperature of the coating material as it flows through the injection channel 103, for achieving a desired viscosity of the coating material within the coating chamber 102. The use of challenging coating materials such as, for example, thermosetting materials, is possible due to an accurate temperature control and material flow throughout the apparatus 100, preventing the deterioration and the setting of the material within the apparatus 100.

According to an embodiment of the present invention, said at least one heating element 104 comprises a first series of heating elements 104 located within the lower casing 109 and a second series of heating elements 104 located within the intermediate casing 110.

To this end, the lower casing 109 can comprise multiple holes for enabling passage of the heating elements 104. Preferably, the first series of heating elements 104 comprises two rows of three heating elements 104, each row being located along a respective side of said coating chamber 102.

The intermediate casing 110 can comprise a second series of heating elements 104 which are positioned perpendicular to said injection channel 103. The second series of heating elements 104 can be formed by pairs of heating elements 104, each pair being spaced from each other with constant pitch along the outer surface of the intermediate casing 110, so as to provide uniform heating of the second portion 132 of the injection channel 103.

Thanks to the arrangement described above of the heating elements 104, the apparatus 100 allows to achieve better uniformity of the thermal exchange between the heating elements 104 and the coating material contained in the injection channel 103 and in the coating chamber 102.

According to the embodiment shown in the drawings, which provides a support casing having three casings 109, 110, 111, the coating apparatus 100 has three main temperature zones according to each of the three casings 109, 110, 111. This is a particularly preferable number of temperature zones and casings for effective operation. However, it is possible to provide embodiments which include two temperature zones and casings or more than three casings and temperature zones, without departing from the object of the present invention.

In this respect, at the second portion 132 of the injection channel 103 (e.g., corresponding to the intermediate casing 110), the coating material is heated to a higher temperature than the temperature of the first portion 131 (i.e., the zone of the upper casing 111); the viscosity of the coating material contained in the second portion 132 of the injection channel 103 therefore decreases with respect to the viscosity of the solid-state coating material present in the first portion 131 of the injection channel 103 provided at the upper casing 111. The coating material may be in a liquid state in the second portion 132 of the injection channel 103 and in the zone of the lower casing 109. Preferably, when employing thermosetting polymers, the maximum temperature at the coating chamber 102 is sufficiently high to thoroughly liquefy the coating materials but controlled to be lower than the temperature at which curing of the thermosetting material occurs.

According to an aspect of the present invention, the coating apparatus 100 comprises a cooling system 119 to cool at least part of said first portion 131 of the injection channel 103. According to an embodiment of the present invention, the cooling system 119 is configured for delivering a flow of liquid coolant within at least one duct located within said support casing of the apparatus 100, in order to cool at least one portion of the injection channel 103 (i.e., the first portion 131 of the injection channel 103) and deliver, together with the heating elements 104, accurate and steep temperature regimes to the coating material as it flows towards the coating chamber 102.

Preferably, the cooling system 119 includes at least one duct, in particular having a spiral shape, said at least one duct being located within said upper casing 111 (i.e., the first portion 131 of the injection channel 103) and extending around said first portion 131 of the injection channel 103.

The circulation of coolant within the cooling system 119 results particularly useful when operative coating cycles (i.e., working cycles comprising at least a loading phase and a pressing phase) with very high operative temperatures are executed, since in these operative conditions, maintaining the operative temperatures at the required values is extremely difficult, due to the heat conduction from the lower casing 109, to the intermediate and upper casings 110, 111 in which the operative temperatures are lower than the temperature provided at the lower casing 109.

Therefore, the combination of heating, provided by the heating elements 104, and cooling, provided by the cooling system 119, enables to deliver much more accurate and steep temperature regimes and control on the viscosity of the coating material as the coating material flows through the different portions of the injection channel 103.

Furthermore, the accurate temperature control of the coating material achieved my means of both the heating elements 104 and the cooling system 119 combined with the above-described control of the pressurizer 105 prevents stagnation and overheating of the coating material within the injection channel 103. As already remarked, preventing stagnation is of paramount importance when employing thermosetting materials.

According to an aspect of the present invention, in order to reach such technical effect (i.e., preventing stagnation and overheating of the coating material) the cooling system 119 must operate synergically with the pressurizer 105. In particular, the cooling system 119 must be configured to keep the coating material in a solid state when in contact with the pressurizer 105; at the same time, the cooling system 119 must be configured to avoid any interference with the heating elements 104. The cooling system 119 is therefore configured to cool exclusively the portion of the injection channel 103 (i.e., the first portion 131) where the pressurizer 105 gets in contact with the solid-state coating material.

According to an aspect of the present invention, the cooling system 119 can be configured to provide variable cooling capacity (i.e., the quantity of heat removed by the cooling system 119), wherein said variable cooling capacity is determined on the basis of the heat generated by said heating elements 104; for example, according to known techniques, a predetermined cooling capacity can be achieved by properly controlling the flow of liquid coolant circulating in the cooling system 119. According to the present invention, the cooling capacity delivered by the cooling system 119 can be determined and controlled, for example, by a control unit comprised in the apparatus 100 (or by a control unit associated to said apparatus 100) on the basis of the heat generated by the heating elements 104; alternatively, the cooling capacity of the cooling system 119 can be predetermined and controlled (for example by said control unit) on the basis of the temperature of the coating material contained, for example, in the second portion 132 of the injection channel 103. To this end, the injection channel 103 may comprise one or more temperature sensors operatively connected to the cooling system 119 and to said control unit; the cooling capacity of the cooling system 119 can be determined and controlled (for example, by said control unit) on the basis of one or more readings provided by said one or more temperature sensors.

This is particularly advantageous when a plurality of coating materials with different physical and chemical properties (e.g., melting temperature, density, viscosity, etc.) are employed over different coating sessions of the same coating apparatus 100. According to an aspect of the present invention, the cooling capacity of the cooling system 119 can be determined (for example, by said control unit) on the basis of the coating material employed in each specific coating session in order to minimize the energy consumption of cooling system 119.

With reference to the temperature management during operation, preferably, the support casing is shaped so that, in the mounted configuration of the apparatus 100, multiple gaps are provided between at least two casings 109, 110, 111, in order to let flow air between the casings 109, 110, 111 and avoid overheating of the apparatus 100 for heat conduction due to the contact between the casings 109, 110, 111.

Thanks to these gaps, the heat transmission through the casings 109, 110, 111 of the coating apparatus 100 is dramatically reduced, enabling easy management of the different temperatures in the first portion 131 and in the second portion 132 of the injection channel 103.

According to another advantageous feature of the invention, the apparatus 100 may comprise an outer casing (not shown in the annexed drawings) made of insulating material, for covering at least said lower casing 119.

For example, the outer casing of insulating material may cover both the lower casing 109 and the intermediate casing 110, enabling the coating chamber 102 to reach very high temperatures (for example, higher than 450° C.) to allow a proper melting of a wide range of polymers. In the following of the present description there will be described in detail a method 300 for applying a coating material to a wire 106 by means of the apparatus 100 according to the present invention.

At step 301, the value of one or more operative parameters of the coating apparatus 100 are determined (for example, by said control unit) as a function of one or more properties of the wire 106 (for example, in terms of material of the wire 106 and/or in terms of geometry of the wire 106) and/or as a function of one or more properties of the coating material to be applied to said wire 106. Said operative parameters can comprise, for example, the power of at least one heating element 104 and the required cooling capacity of the cooling system 119, the feeding speed of the wire 106, the pressure to be exerted on the coating material by the pressurizer 105, etc.

For example, the power of the heating elements 104 and/or the required cooling capacity of the cooling system 119 and/or the pressure to be exerted on the coating material by the pressurizer 105 can be determined (for example, by said control unit) on the basis of the properties of the coating material to be applied on the wire 106.

At step 302, the coating apparatus 100 is configured to operate according to the one or more operative parameters determined at step 301. For example, the power of the heating elements 104 and/or the cooling capacity of the cooling system 119 can be set according to the operative parameters determined at step 301.

The method 300 according to the present invention further comprises a step 303 wherein the pressurizer 105 is operated according to said loading phase (i.e., setting the pressurizer 105 in a position that allows said injection channel 103 to receive said predetermined quantity of solid-state coating material); in particular, according to an embodiment of the present invention, the stem 155 of the pressurizer 105 is driven at a raised position, for enabling input of coating material into the injection channel 103 by means, for example, of the screw feeding element 203 of the automated feeding system 200.

The method 300 further comprises a step 304 wherein the pressurizer 105 is operated according to said pressing phase (i.e., exerting a predetermined pressure on the coating material in the injection channel 103). For example, according to an embodiment of the present invention, the actuator 118 of the pressurizer 105 moves the stem 155 from the raised position and applies the desired pressure to the coating material within the injection channel 103 of the coating apparatus 100.

The coating material is pressurized by the stem 155 to the pressure at which it is required to apply the coating material on the wire 106. Once this pressure is reached, the stem 155 does not pressurize the coating material any further but is controlled to maintain the pressure within the injection channel 103 and the coating chamber 102 almost steady at the desired value for applying the coating material on the wire 106.

The gradual increase of temperature of the coating material occurs as the coating material progresses through the injection channel 103. Specifically, at the second portion 132 of the injection channel 103, the coating material is progressively heated until reaching a predetermined temperature, thus turning into a liquid state and filling the coating chamber 102.

The method 300 according to the present invention further comprises a step 305 wherein the wire 106 is received at the inlet port 120 of the coating chamber 102 of said coating apparatus 100 for applying said coating material to the wire 106. The wire 106 passing through the coating chamber 102 is therefore coated by the liquid coating material located within the coating chamber 102.

At step 306, the wire 106 is coated by the liquid coating material, carrying away from the chamber 102 an amount of coating material which corresponds to the coating layer applied on the outer surface of the wire 106; at step 306, a layer of coating material is therefore applied to the wire 106.

The method 300 further comprises a step 307 wherein the wire 106 is released through an outlet port 121 of the coating chamber 102.

After step 307, the pressurizer 105 is configured to release the pressure off the coating material; the method 300 according to the present invention then cycles back to step 303 (if the properties of the wire 106 and/or of the coating material are the same of the previous cycle), otherwise the method 300 cycles back to step 301 (if the properties of the wire 106 and/or of the coating material are different from the ones of the previous cycle).

The wire 106 obtainable by the method 300 according to the present invention is characterized by unique thermal and mechanical properties which are not achievable by known coating techniques; for example, the method 300 is capable of obtaining a wire 106 characterized by optimal adhesion between the wire and the coating layer. While guaranteeing optimal adhesion, the apparatus 100 is also capable of applying in one step (i.e., a single transit of the wire 106 through the apparatus 100) a layer of coating material much thicker than the layer of coating material achievable by known coating techniques; in this case, the thickness of the coating layer is in fact strongly limited by the presence of solvents in the coating material which evaporate after the coating procedure. For this reason, according to known coating techniques, in order to achieve a predetermined thickness of the coating layer, it is often necessary to apply multiple layers of coating material on the wire thus compromising the uniformity of the resulting coating layer. On the contrary, the apparatus 100 according to the present invention is capable of applying on the wire 106 a layer of coating material much thicker than that achievable by known techniques, thus minimizing the number of layers of coating material. The wire 106 according to the present invention is therefore characterized by optimal properties in terms of, for example, adhesion, uniformity, smoothness, etc.

Thanks to the above described structural and functional characteristics of the coating apparatus 100, an easily maintainable coating apparatus 100 for applying a coating material to a wire 106 is achieved, which enables an effective temperature management during operation, enhancing operative parameter ranges such as pressure, temperature, wire 106 speed and wire 106 coating thickness, in order to achieve a wire 106 coated with polymers which are extremely difficult to process with known technologies.

Furthermore, the coating apparatus 100 according to the present invention provides accurate and steep temperature regimes and control on the viscosity of the coating material, as the coating material flows through the different portions of the injection channel.

Further, the coating apparatus 100 according to the present invention is capable of avoiding deterioration of the coating material by avoiding stagnation.

Naturally, while the principle of the invention remains the same, the details of construction and the embodiments may widely vary with respect to what has been described and illustrated purely by way of example, without departing from the scope of the present invention.

The invention claimed is:

1. An apparatus for applying a coating material to a wire, said apparatus comprising:

a coating chamber for applying a coating material to the wire, wherein the coating chamber comprises an inlet port configured for receiving the wire and an outlet port configured for releasing the wire, an elongate injection channel comprising a first portion and a second portion, said first portion comprising an opening for receiving a predetermined quantity of coating material in a solid-state, said second portion configured for progressively melting the coating material and being in communication with the coating chamber, at least one heating element configured to raise the temperature of the coating material as the coating material flows through the injection channel, a pressurizer configured to operate according to a first operating phase during which the pressurizer exerts a predetermined pressure on said coating material in said first portion of the injection channel, and a second operating phase during which the pressurizer is in a position that allows said injection channel to receive said predetermined quantity of solid-state coating material, and a cooling system configured to cool at least part of said first portion of the injection channel to prevent direct contact between the pressurizer and the melted coating material, wherein said pressurizer comprises a stem axially driven along the length of said first portion of the injection channel by means of an actuator, so as to effectively tune the pressure inside the coating chamber by adjusting dynamically the movement of the stem as the coating material progresses through the injection channel.

2. The apparatus according to claim 1, wherein said at least one heating element comprises a plurality of heating elements, and wherein the coating apparatus further comprises a support casing comprising:

an upper casing comprising said first portion of the injection channel and at least one duct having a spiral shape, said at least one duct extending around said first portion of the injection channel, and an intermediate casing comprising said plurality of said heating elements and said second portion of the injection channel, wherein said cooling system is configured for delivering a flow of liquid coolant inside said at least one duct.

3. The apparatus according to claim 1, wherein the cooling system is configured to provide a variable cooling capacity, wherein said variable cooling capacity is determined on the basis of the heat generated by said at least one heating element.

4. The apparatus according to claim 3, wherein the injection channel comprises one or more temperature sensors operatively connected with said cooling system, wherein said variable cooling capacity is determined and controlled on the basis of one or more readings provided by said one or more temperature sensors.

5. The apparatus according to claim 1, wherein said pressurizer comprises a stroke length, said stroke length being limited to said first portion of the injection channel.

6. The apparatus according to claim 1, wherein said pressurizer is configured to engage with the opening of the injection channel during said first operating phase.

7. The apparatus according to claim 1, wherein said apparatus further comprises a feeding system for driving the coating material within said injection channel through said opening, wherein said feeding system comprises:

a hopper provided for inserting the coating material, a duct connecting said hopper with said opening, a screw feeding element provided within said duct for rotating within the duct and driving the coating material through the duct, up to reach said opening and enter into the injection channel.

8. A method for applying a coating material to a wire by means of an apparatus according to claim 1, said method comprising the following steps:

determining one or more operative parameters of the apparatus as a function of one or more properties of the wire and/or as a function of one or more properties of the coating material, said one or more operative parameters comprising at least a cooling capacity of the cooling system;

configuring the apparatus to operate according to said one or more operative parameters;

setting the pressurizer in a position that allows said injection channel to receive said predetermined quantity of solid-state coating material;

operating said pressurizer for obtaining a pressing phase for exerting a predetermined pressure on said coating material in said injection channel;

receiving the wire at the inlet port of the coating chamber;

applying a layer of the melted coating material to the wire; and releasing the wire through the outlet port of the coating chamber.

* * * * *